(12) United States Patent
Fennell

(10) Patent No.: US 8,866,869 B2
(45) Date of Patent: Oct. 21, 2014

(54) PAROLEE COMMUNICATION AND CONTROL SYSTEM AND METHOD

(76) Inventor: Robert Fennell, Huntingdon, PA (US)

(*) Notice: Subject to any disclaimer, the term of this patent is extended or adjusted under 35 U.S.C. 154(b) by 197 days.

(21) Appl. No.: 13/534,464

(22) Filed: Jun. 27, 2012

(65) Prior Publication Data

US 2014/0002575 A1 Jan. 2, 2014

(51) Int. Cl.
*H04N 7/14* (2006.01)

(52) U.S. Cl.
USPC .................................. 348/14.02; 340/539.13

(58) Field of Classification Search
USPC ............. 340/539.13; 348/14.01, 14.04, 14.02
See application file for complete search history.

(56) References Cited

U.S. PATENT DOCUMENTS

| | | | |
|---|---|---|---|
| 6,593,851 B1* | 7/2003 | Bornstein | 340/539.15 |
| 2005/0068169 A1* | 3/2005 | Copley et al. | 340/539.13 |
| 2008/0062120 A1 | 3/2008 | Wheeler et al. | |
| 2011/0248853 A1* | 10/2011 | Roper et al. | 340/573.4 |
| 2012/0086574 A1* | 4/2012 | Blumel et al. | 340/573.3 |
| 2012/0270559 A1* | 10/2012 | Ingerson | 455/456.1 |
| 2013/0027837 A1* | 1/2013 | Myers | 361/232 |
| 2013/0120518 A1* | 5/2013 | Kiet et al. | 348/14.01 |
| 2013/0121658 A1* | 5/2013 | Kiet et al. | 386/224 |
| 2013/0332073 A1* | 12/2013 | Thomas | 701/487 |

* cited by examiner

*Primary Examiner* — Olisa Anwah
(74) *Attorney, Agent, or Firm* — Baker & Hostetler LLP

(57) ABSTRACT

A communication and control system and method for a parolee includes a communication device including a visual alert component capable of providing one-way communication to the parolee, an auditory link capable of providing two-way verbal communication to and from the parolee, and a visual link capable of providing two-way visual communication to and from the parolee, and a GPS tracking device configured to indicate the location of the parolee. The communication device and the GPS tracking device are configured to be controlled remotely.

9 Claims, 5 Drawing Sheets

PAROLEE COMMUNICATION AND CONTROL SYSTEM AND METHOD

TECHNICAL FIELD

The present invention relates generally to a system and method for communicating with and controlling behaviour of parolees.

BACKGROUND

In many criminal justice systems, parole is the supervised release of a prisoner before the completion of their sentence in prison. Overpopulation of prison systems, along with budget cutbacks at the state and federal level highlight the need for effective parole systems. Parole systems provide a further benefit to society by permitting parolees to gradually be reintroduced into free society. For this reason, some criminal justice systems enforce an additional mandatory parole period after a prisoner has been released. There are other types of parole, such as medical parole or compassionate release which may be appropriate for releasing prisoners for medical or humanitarian reasons.

Parolees are often subject to various restrictions in conduct such as refraining from drug and alcohol use, avoiding contact with the parolee's victims, obtaining employment, and maintaining required contacts with a parole officer. Often, parolees must agree to these restrictions while they are prisoners as a condition of their release. These restrictions are often intended as a way to limit the risk of recidivism.

While the various restrictions above are helpful in limiting recidivism, further restrictions, along with a system for tracking, communicating with, and controlling parolees may lead to expansion and increased effectiveness of parole systems.

SUMMARY

A communication and control system for a parolee includes a communication device including a visual alert component capable of providing one-way communication to the parolee, an auditory link capable of providing two-way verbal communication to and from the parolee, and a visual link capable of providing two-way visual communication to and from the parolee and a GPS tracking device configured to indicate the location of the parolee. The communication device and the GPS tracking device are configured to be controlled remotely.

A method for controlling behaviour of an individual includes providing a visual alert to the individual, communicating a verbal message to the individual, and determining the location of the individual using a GPS system.

A control and communication system configured to provide corporal control of a parolee and to provide communication between the parolee and at least one other individual includes a visual alert device controlled by the at least one other individual and configured to provide an alert to the parolee, an auditory communication device configured to provide two-way auditory communication between the at least one other individual and the parolee, and a visual communication device configured to provide two-way visual communication between the at least one other individual and the parolee. The system further includes a GPS tracking device configured to indicate to the at least one other individual the location of the parolee.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
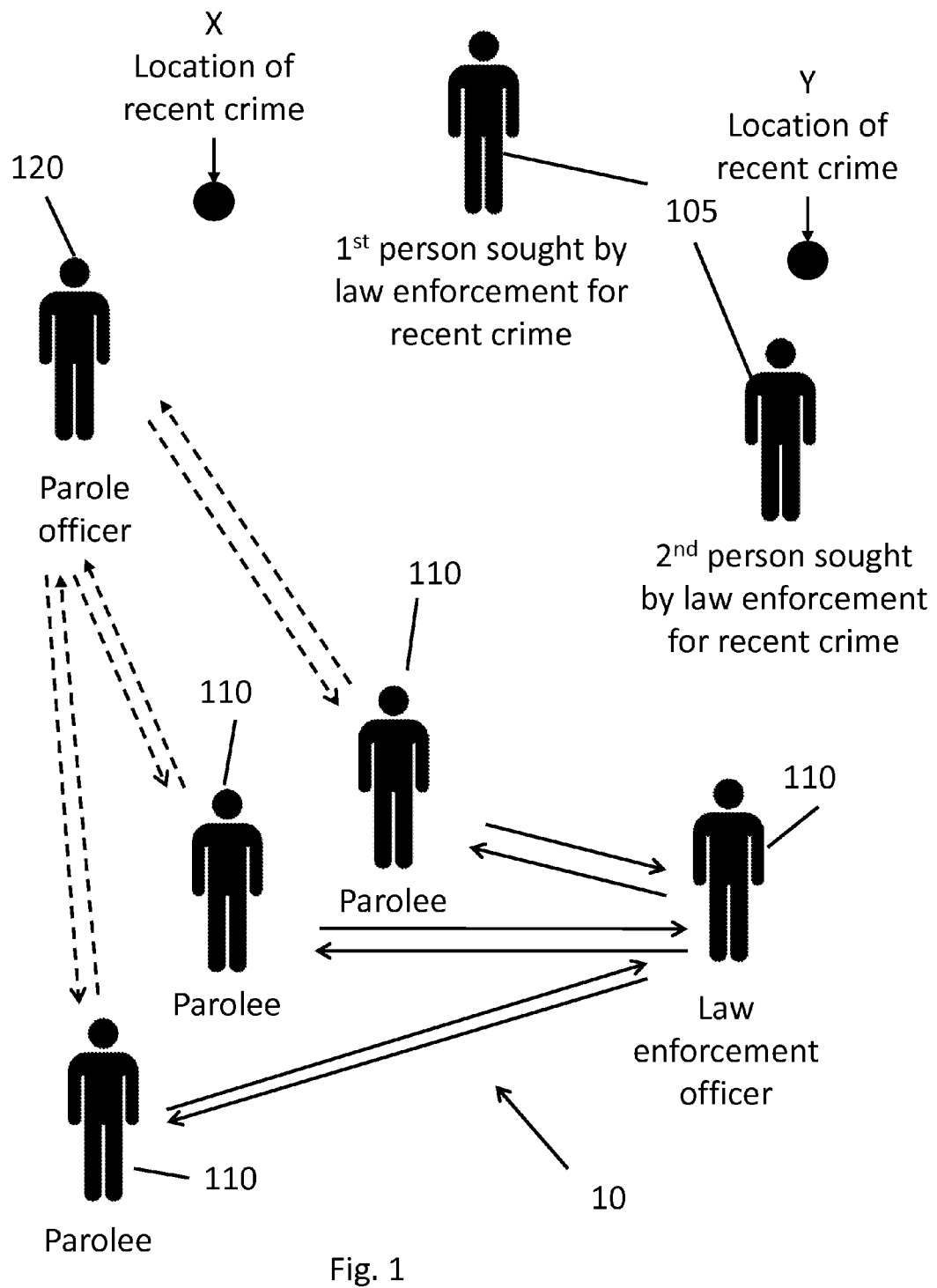
FIG. 1 is a schematic of one embodiment of a communication and control system.
Figure 2:
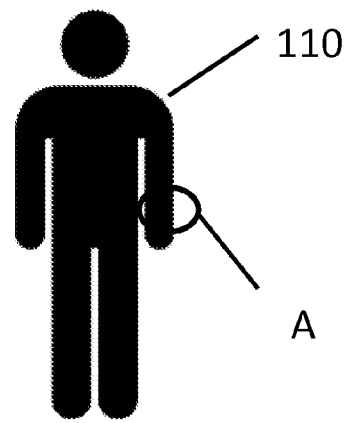
FIG. 2 is a schematic of part of the communication and control system shown in FIG. 1.
Figure 2A:
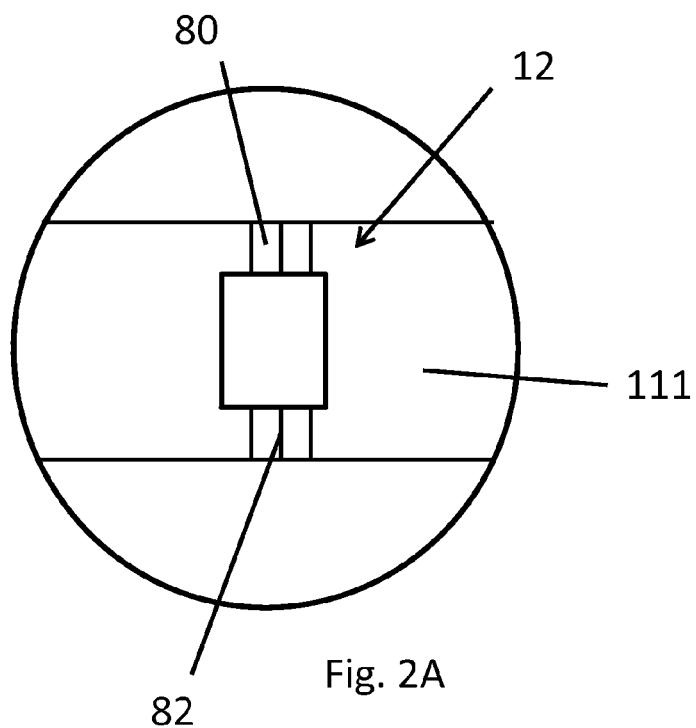
FIG. 2A is a schematic of the part of the communication and control system shown in circle A of FIG. 2, magnified to show greater detail.

FIGS. 1-6 show various aspects of one embodiment of the communication and control system for parolees. The system has three main subsystems: (1) a GPS tracking subsystem 60; (2) a communication subsystem 20; and (3) a corporal control subsystem 70. As described in greater detail below, parts of these subsystems 20, 60, 70 are housed in a wrist unit 12. As shown in FIGS. 2, 2A, the wrist unit 12 may be configured to be attached to the wrist 111 of a parolee 100. Subsystems 20, 60, 70 also have components that are located remotely from the wrist unit 12, as depicted by remote control unit 90 in FIG. 3. These subsystems function together so that a user of the remote control unit 90, such as a police officer 110, or other law enforcement officer such as a parole officer 120 can track, communicate with, and, if necessary, control a parolee 100 or multiple parolees 100.

GPS Tracking Subsystem

Figure 3:
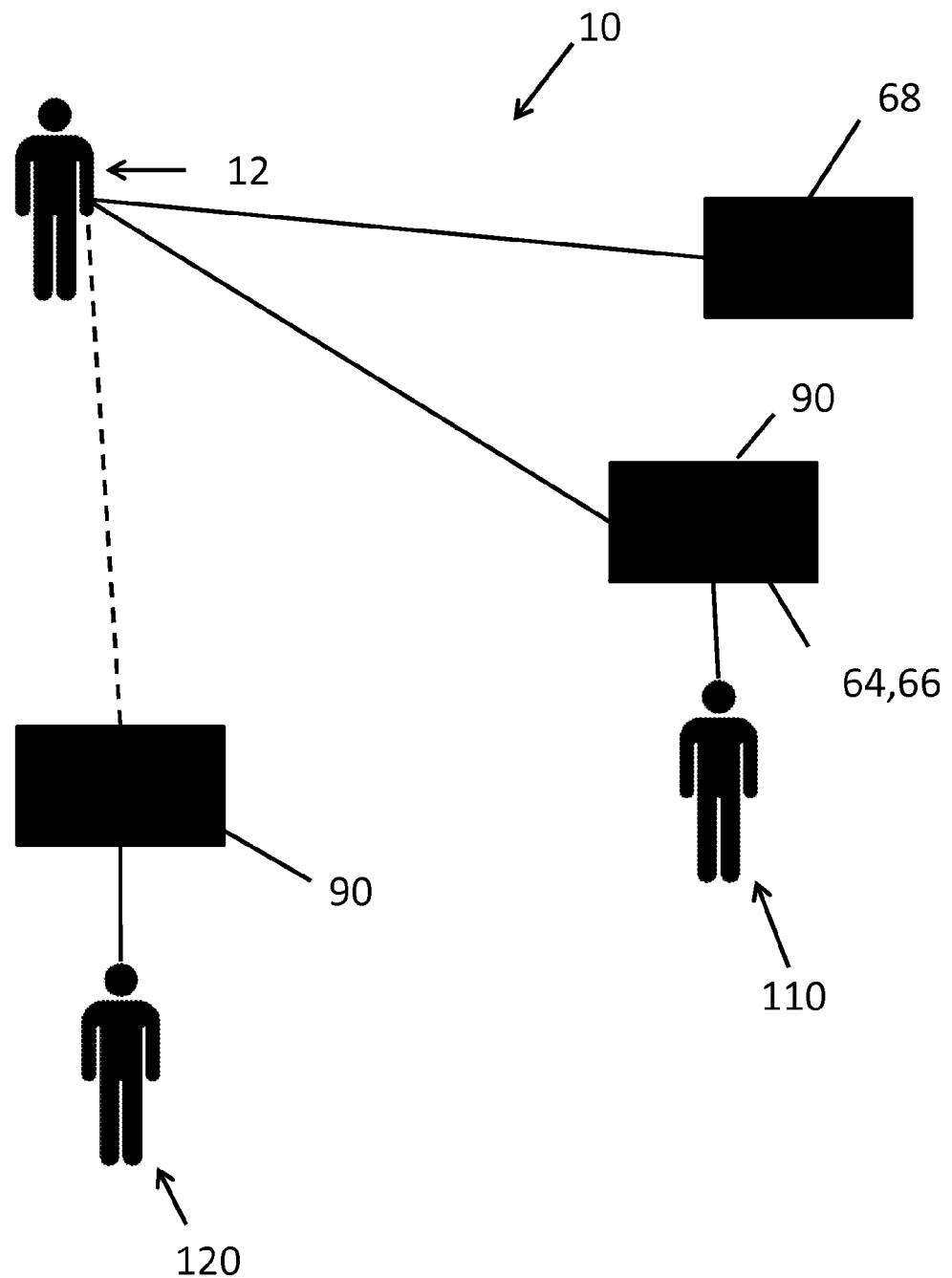
FIG. 3 is a schematic of the communication and control system shown in FIGS. 1-2A.
Figure 5:
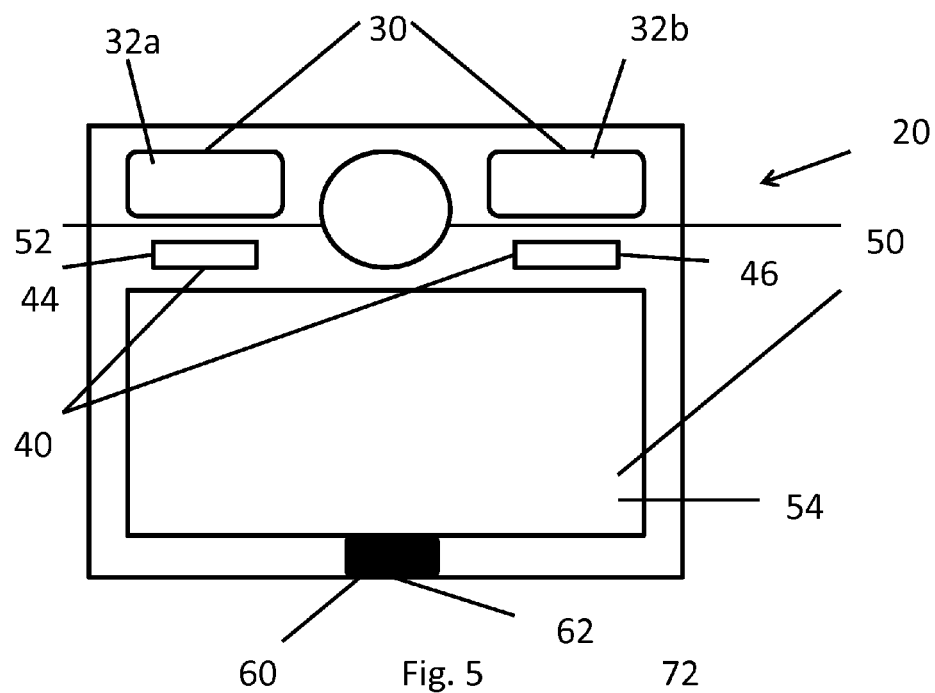
FIG. 5 is a schematic of part of the communication and control system shown in FIGS. 1-4.

As shown in detail in FIGS. 3 and 5, GPS tracking subsystem 60 comprises a tracking device 62 located in wrist unit 12 and a base 64 located in remote control unit 90. Base 64 includes GPS software 66 that, in connection with GPS satellites 68, can be used to identify the location of the tracking device 62. The tracking device 62 calculates its position by precisely timing the signals sent by GPS satellites 68. Each satellite 68 continually transmits messages that include the time the message was transmitted and the satellite position at time of message transmission. The tracking device 62 uses the messages it receives to determine the transit time of each message and computes the distance to each satellite. These distances along with the satellites' locations are used to compute the position of the tracking device 62. This position is then transmitted from the tracking device 62 to the base 64 via a cell signal that is also part of the communication subsystem.

Tracking device 62 transmits location data at regular intervals which may be received by the GPS software 66. The software 66 is configured to display the location of the tracking device 62 on a map backdrop in the remote control unit 90 so that the location of the parolee 100 is available in real time on the remote control 90. The software 66 may further be configured to create and store a record of the recent locations of the parolee 100. For example, in addition to displaying the real time location of a parolee on a map backdrop, the remote control unit 90 may also display a list of locations where the parolee 100 has been in the past 24 hours. In other embodiments, the software 66 may be configured to display a list of locations where the parolee has been for longer periods of time, such as the past 72 hours.

Communication Subsystem

As shown in detail in FIG. 5, the communication subsystem 20 has three main components: a visual alert device 30, an auditory link 40, and a visual link 50. The visual alert device 30 includes two lights 32a,b. In some embodiments, lights 32a,b may each have different colors. For example, light 32a may be a red light and light 32b may be a green light. The visual alert device 30 is configured to be controlled remotely by remote control 90 in order to provide one-way communication from a user of the remote control unit 90 to the parolee 100. In some embodiments, remote control 90 is configured to have a button that can activate either light 32a or 32b. In other embodiments, software installed on remote control 90 is configured to activate lights 32a,b. Activation of the lights 32a,b may be semi-autonomous such that software on the remote control 90 is configured to activate lights at set times without user input. For example, when a crime is reported, red light 32a may automatically be activated. In some embodiments, lights 32a,b may also be activated by a user command.

The auditory link 40 includes a speaker 42 and a microphone 44 located on single unit 12. The auditory link 40 further includes a speaker and microphone located on the remote control 90 (not shown). The respective speakers and microphones are configured to connect to one another so that the parolee 100 and the user of the remote control 90 can speak with one another. In some embodiments, the remote control 90 may be configured so that microphone 44 is activated without the parolee's knowledge and the user of the remote control 90 can hear what is going on around the parolee.

Figure 6:
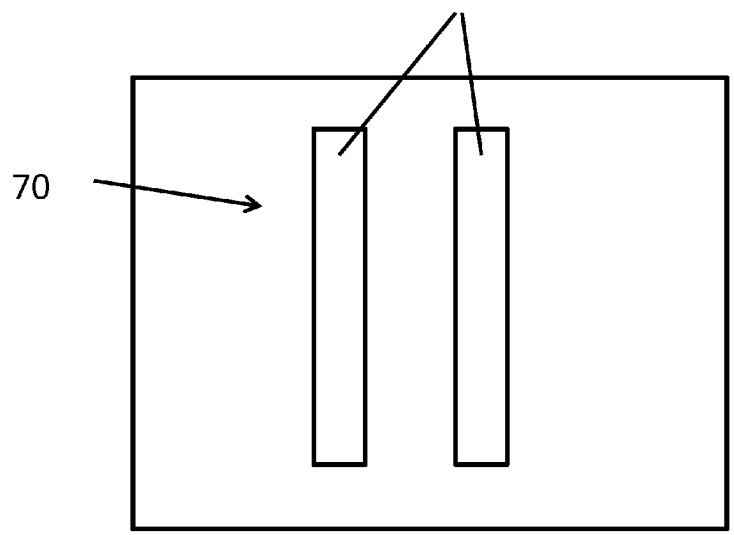
FIG. 6 is a schematic of part of the communication and control system shown in FIGS. 1-5.

The visual link 50 includes a camera 52 and a screen 54, both located on single unit 12. The visual link 50 further includes a camera and screen located on the remote control 90 (not shown). The respective speakers and microphones are configured to connect to one another so that the parolee 100 and the user of the remote control 90 can see one another. In some embodiments, the remote control 90 may be configured so that the camera 52 is activated without the parolee's knowledge and the user of the remote control 90 can see what is going on around the parolee Corporal Control Subsystem As best shown in FIG. 6, the communication and control system 10 further comprises a corporal control subsystem 70 that includes two electrodes 72 that produce an alternating current that may be configured to contact the parolee 100. For example, this current may provide a low-level shock that does not endanger the life or well-being of the parolee, but may provide an unpleasant sensation to the parolee. The electrodes 72 are controlled by the remote control 90 and may have varying intensities. The varying intensity may be based on waveform, its frequency, the pulse rate, amperage, current, voltage and/or impedance. The electrodes 72 may be configured to have at least two settings such as a high intensity setting and a low intensity setting. Some embodiments may further include settings to take into account environmental changes that may affect the perceived intensity.

The corporal control subsystem 70 further includes a wrist band 80 that has a tamper ring 82. Wrist band 80 may be composed of steel that is very hard to cut such as a malleable alloy of iron and carbon. Tamper ring 82 may be configured such that if there is an attempt to remove the wrist band 80, electrodes 72 may immediately emit current. The wrist unit 12 may further be configured to send a message to remote control unit 90 to indicate that the wrist band 80 has been tampered with. The remote control unit 90 may further be configured to send an alert to the nearest police officer 110 to find the parolee 100 and further assess the situation.

Examples of Use of System

In the embodiment shown in FIG. 1, one or more crimes have recently been reported and one or more persons 105 are being sought by law enforcement in connection with the one or more crimes that occurred at at least one location X,Y. One or more persons 105 may or may not also be parolees 100. In an initial step, a law enforcement officer, such as a police officer 110 or parole officer 120 can activate the GPS subsystem 60 to determine if any parolees are suspiciously close to a location X,Y of a recently reported crime. If the law enforcement officer has reason to suspect that at least one parolee 100 may have been involved in the crime, the officer can then initiate the communication subsystem 20. Communication subsystem 20 may be used to send a message to a parolee 100 to let him know that he should maintain his current location so that the law enforcement officer can come to question him. For example, the message may be in the form of activating red light 32a on the wrist unit 12. The activation of the light 32a will indicate to the parolee 100 if he should maintain is current position. Activation of the green light 32b will indicate to the parolee 100 that he is free to move to another area.

If the GPS subsystem 60 indicates that the parolee 100 has not followed orders, the law enforcement officer can utilize the auditory and/or visual links 40, 50 to communicate with the parolee 100 to further assess the situation. The GPS subsystem 60 may further be utilized to track the parolee's location to detain him. If the law enforcement officer is unable to detain the parolee, the officer may employ the corporal control subsystem 70 by using the remote control unit 90 to activate the electrodes 72 on the wrist unit 12, activating current within the electrodes that are in contact with the parolee.

Figure 4:
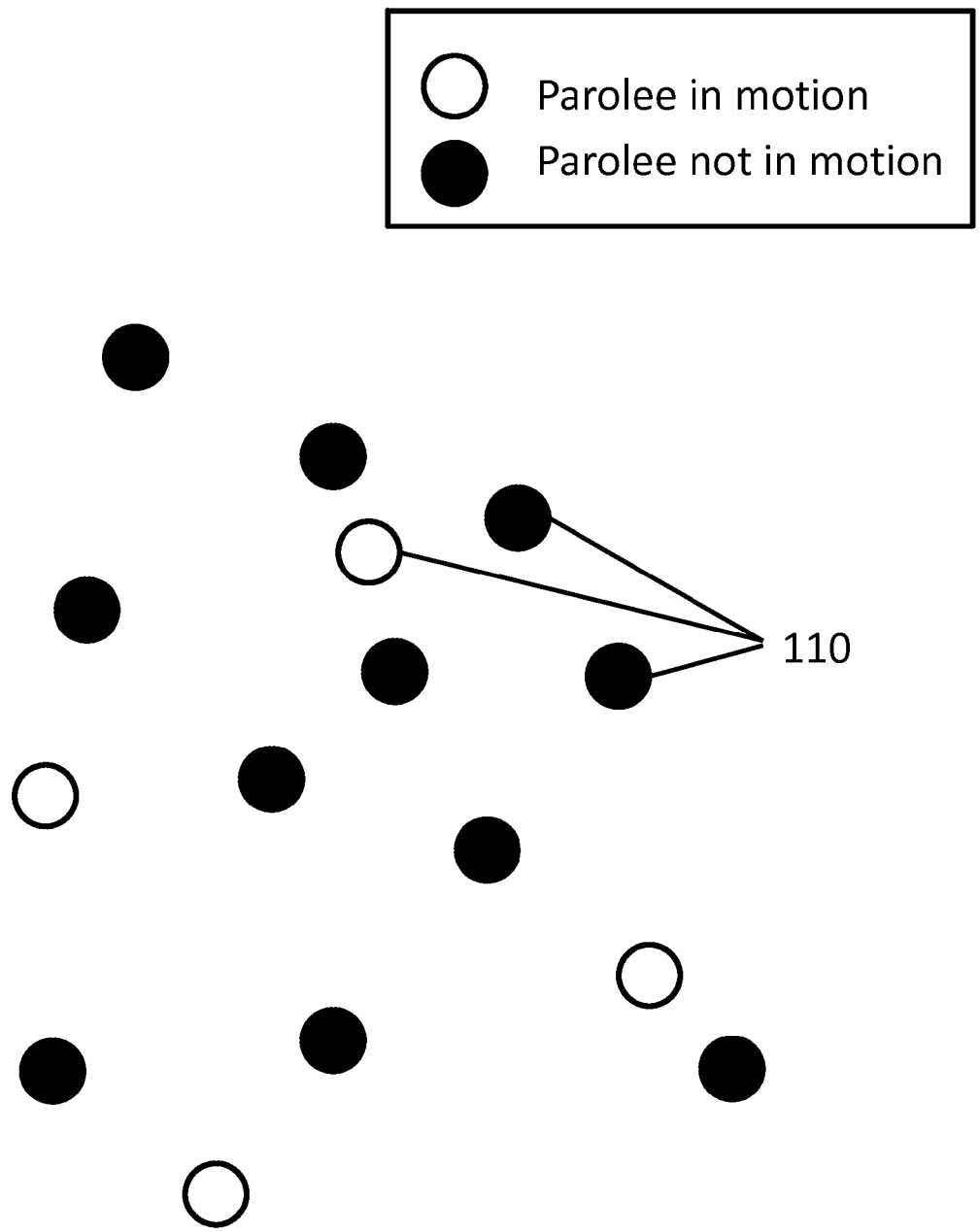
FIG. 4 is a schematic of part of the communication and control system shown in FIGS. 1-3.

The communication and control system in the embodiment shown is further configured to communicate with any parolee within the vicinity of a recent crime location X,Y. For example, in order to avoid potential involvement in a police chase, all parolees 100 within a certain distance of a recent crime location X,Y may have the red light 32a on their wrist units 12 activated, indicating to each parolee that he should maintain his current position. As shown in FIG. 4, the remote control unit 90 may be used to display which parolees have followed the order to maintain their current position and which parolees are still in motion. Communication subsystem 20 and corporal control subsystem 70 may then be employed to further assess and control the situations involving the moving parolees.

The GPS subsystem 60 may further be used to identify parolees who are otherwise acting suspiciously. Specifically, a law enforcement officer may activate the GPS subsystem 60 to ascertain the whereabouts of one or more parolees 100. This activation may indicate to a law enforcement officer that a parolee 100 is in an area that is restricted to him as one of the conditions of his parole. In one example, the parolee may be a registered sex offender required to stay 400 yards away from a school. If the GPS subsystem indicates that the parolee 400 is within 400 yards of a school, the law enforcement officer may activate the communication subsystem 20 in order to inform the parolee that he is in violation of his parole. If necessary, the law enforcement officer may also activate the corporal control subsystem 70.

In another example, the GPS subsystem 60 may indicate that two parolees are both in the same location, which is a violation of one or both parolee's conditions of parole. The law enforcement officer may choose to activate the communication subsystem 20 and/or the corporal control system 70. Alternatively, the law enforcement officer may go to the location of the two parolees.

Similarly, the communication and control system 10 may be used to track, communicate with, and control parolees in other situations, such as when no crime has been reported. For example, one condition of a parolee's release may be to obey a curfew. The GPS tracking subsystem 60 may be used to ascertain the whereabouts of a parolee 100 and determine if the parolee 100 is at his or her residence. If necessary, the communication subsystem 20 may be used so that a police officer 110 or other law enforcement officer such as a parole officer 120 can talk to the parolee 100 and/or see the parolee and his or her surroundings.

It is understood that the embodiment described is exemplary and in no way meant to limit the language of the claims. In that regard, while the embodiment described relies on the involvement of a law enforcement officer, such as a police officer 110 or a parole officer 120, it will be appreciated that this role may be filled by non-governmental associates such as private law enforcement contractors and their staff. Further, while remote control unit 90 is described as a single unit, its functions may be separated into two or more units that may be operated by one or more users. For example, the GPS base 64, containing GPS software 66 may be located at police headquarters and used by a first police officer 110. The first police officer may also control the visual alert device 30. A parole officer 120 (as shown by the dashed line in FIG. 3) or second police officer 110 may control the visual and auditory links 40, 50 using a remote control unit 90 that is independent from the unit 90 located at police headquarters. The second police officer 110 or a third police officer 110 may control the corporal control subsystem 70.

The invention claimed is:

1. A communication and control system for a parolee comprising:
   a communication device including at least one red light and at least one green light capable of providing one-way communication from a first entity to the parolee and from a second entity to the parolee, a first microphone and speaker capable of providing two-way verbal communication between the first entity and the parolee and between the second entity and the parolee, and a first camera and video screen capable of providing two-way visual communication between the first entity and the parolee and between the second entity and the parolee;
   a GPS tracking device including a GPS software configured to:
      indicate a location of the parolee to the first and second entities;
      create and store a record of recent locations of the parolee;
      display a list of locations where the parolee has been for a predetermined period of time;
      trigger the at least one red light on if the parolee has been in a redetermined location for a predetermined period of time; and
      trigger the at least one green light on if the parolee is not located in the predetermined location; and
   a corporal control device comprising a set of electrodes configured to contact the parolee and a band with a tamper ring that is linked to the set of electrodes, the set of electrodes generating an electric shock with different levels of intensities and emitting the electronic shock if there is an attempt to remove the wrist unit;
   wherein the communication device and the GPS tracking device are configured to be controlled remotely by at least one remote control unit that includes a light controller to enable the one-way communication to the parolee, a second microphone and speaker to enable the two-way verbal communication to and from the parolee, and a second camera and video screen to enable the two-way visual communication to and from the parolee,
   wherein the corporal control device is configured to be controlled remotely by the at least one remote control unit that includes a controller for the electric shock with different levels of intensities, and
   wherein the at least one remote control unit are configured to display the location of the parolee, and a duration of the parolee in the location.

2. The system of claim 1 wherein the at least one remote control unit is configured to be controlled by the first entity.

3. The system of claim 2 wherein the first entity is a police officer.

4. The system of claim 1 wherein the at least one remote control unit is configured to be controlled by the second entity.

5. The system of claim 4 wherein the second entity is a parole officer.

6. The system of claim 1 wherein the communication device and the GPS tracking device are housed in a single unit configured to be attached to the parolee.

7. The system of claim 1 wherein a visual alert component of the communication device comprises at least two lights.

8. The system of claim 1 wherein an auditory link of the communication device provides two-way communication between the parolee and a police officer.

9. The system of claim 1 wherein a visual link of the communication device provides two-way communication between the parolee and a parole officer.

* * * * *